Figure 1:
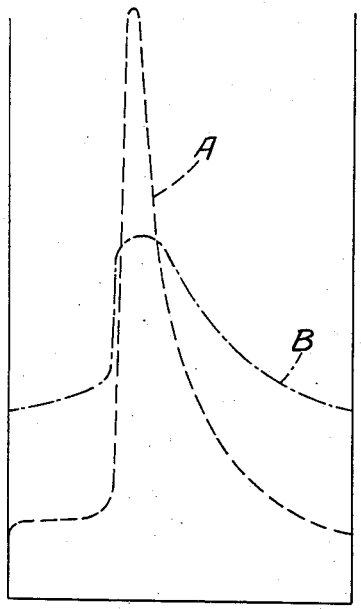

Sept. 3, 1957  B. E. LÖFGREN  2,805,047
METHOD FOR HEAT RECOVERY
Filed April 25, 1955

INVENTOR:
BROR ERIK LÖFGREN
BY Howson & Howson
ATTYS.

United States Patent Office

2,805,047
Patented Sept. 3, 1957

2,805,047
METHOD FOR HEAT RECOVERY
Bror Erik Löfgren, Stockholm, Sweden, assignor to AB Svenska Flaktfabriken, Stockholm, Sweden Application April 25, 1955, Serial No. 503,423

1 Claim. (Cl. 257—71)

The present invention relates to a method for heat recovery from a mixture of water vapour and air exhausted from an intermittent heat emitting process with varying heat emission, preferably warm pressing of hard wall boards, by means of one or more heat exchangers.

Hard fiber boards, so-called hard wall-boards, are usually manufactured by warm pressing. During the pressing, a part of the water of the boards is discharged in form of water vapour, which is exhausted by means of fans. The pressing process is an intermittent heat emitting process, and the temperature of the exhausted vapour-air mixture varies during each cycle within wide limits, as is illustrated by the curve A in the accompanying Fig. 1. This variation is very disadvantageous in for instance heat recovery from vapour-air mixtures. It is an object of the invention to eliminate this disadvantage.

The invention is mainly characterized in that said vapour-air mixture before passing the heat exchanger(s) is exposed to a flowing medium, for instance water, which medium during a part of its travel is brought into direct contact with the vapour-air mixture and the temperature of which during each cycle of the process (pressing cycle) perpetually is maintained out of phase with respect to the temperature of the exhausted vapour-air mixture in such a manner that during stages with the high temperature of the vapour-air mixture said mixture is exposed to water of the low temperature and vice versa.

It is thus an object of the invention to equalize the above mentioned variation in the heat content. The invention is based upon the knowledge that warm and cold water has a tendency to form separate layers. According to a suitable embodiment of said method, the flowing medium (water) is caused to circulate in such a manner that it passes through the vapour-air current an even number of times, preferably twice, during each cycle.

A suitable apparatus for practicing the method according to the invention consists of one or more heat exchangers arranged in a channel for a descending vapour-air mixture and provided with means for conducting said vapour-air mixture and outdoor air as heat exchanging media and with means arranged in front of said heat exchangers for the distribution and circulation of a medium, for instance water, in a closed circuit. The apparatus is primarily characterized by a container arranged below said channel for collecting said flowing medium after it has passed through the channel counter current to the vapour-air mixture, said container having such a volume that the circulating medium passes through the vapour-air current an even number of times, preferably twice, during each cycle.

The invention will now be described in greater detail with reference to the accompanying drawing, where Fig. 1 shows a curve A illustrating the temperature of the vapour-air mixture exhausted during a cycle of the warm pressing before the heat exchange and a curve B illustrating the temperature of the descending mixture after the heat exchange.

Figure 2:
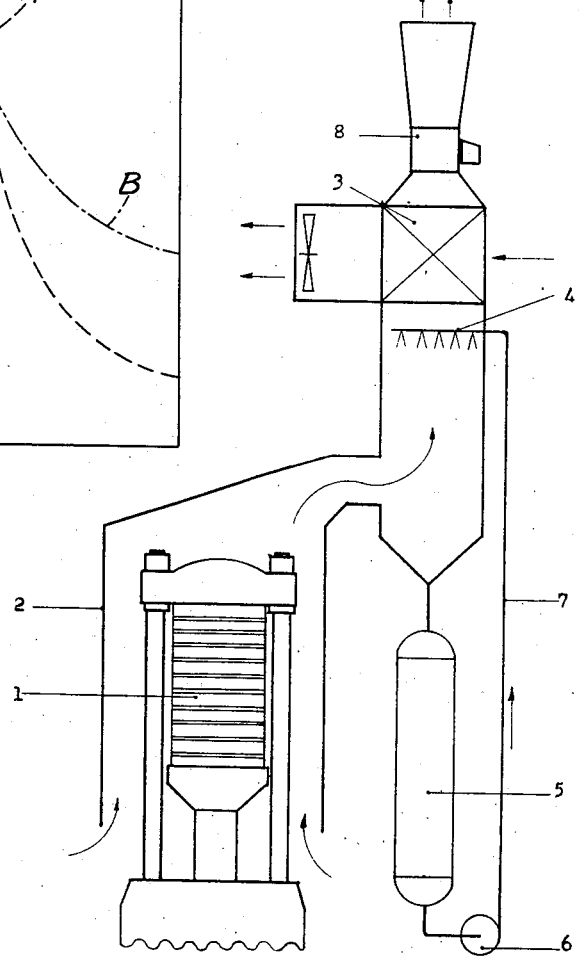

Fig. 2 shows schematically an apparatus suitable for practicing the method.

In Fig. 2, reference number 1 designates a warm press for the manufacture of hard wall boards. The press is shown enclosed by a hood 2 for collecting the vapours discharged from the press, which vapours are conducted to a heat exchanger 3. The vapour-air mixture exhausted from the press is during its travel to the heat exchanger exposed to a water flow distributed over the cross sectional area of the channel by means of spraying means in form of a set of jets 4. The sprayed water is collected below the heat exchanger and is conducted to a container 5 from which the water by means of a pump 6 and pipe line 7 is recirculated to the heat exchanger and the spraying means. As earlier mentioned the container 5 has a small cross sectional area in relation to its height, whereby the water can form a number of different layers of different temperatures. In direct connection with the heat exchanger 3 there is arranged a fan 8. In the illustrated apparatus, said heat exchanger is used for heating ventilating air for the factory. The heat exchanger may, however, also be used for any other purpose, for instance for heating water for the fabrication process.

According to the invention the water is caused partly to accumulate heat and partly to give off heat. An important equalization of the substantial variation in temperature and heat content in the vapour-air mixture discharged from the process is thus obtained. The invention provides a number of advantages. It is thus possible to diminish the size of the fan for exhausting the vapour-air mixture from the press, as the volume of the mixture will be decreased by condensation of water vapour in the heat exchanger 3. The mixture leaves the heat exchanger 3 in saturated condition, which is an advantage with respect to the heat transmission in the heat exchanger 3, the surface of which can be decreased to a corresponding degree. The invention involves the advantage of using the balance wheel principle, whereby a comparatively constant temperature of the medium heated in the heat exchanger can be obtained.

What I claim is:

The method of heat recovery comprising the following steps: continuously passing a gaseous medium over heat emitting apparatus and a heat exchanger, operating the heat emitting apparatus intermittently at regular intervals with high heat being given during each operation of the heat emitting apparatus and absorbed by the gaseous medium, passing the gaseous medium through a water spray after it leaves the heat emitting apparatus and prior to passage through the heat exchanger with that portion of the continuous flow of the gaseous medium highly heated by the heat emitting apparatus heating the water as it passes through the spray, collecting the water from the water spray in a storage container, maintaining the portion of the water heated by the highly heated medium in the storage container in one layer and maintaining that portion of the water spray which is contacted by the relatively unheated gaseous medium and is unheated in the storage container in another layer, causing water from the unheated layer in the storage container to be contacted in the water spray by the medium highly heated during operation of the heat emitting apparatus to remove some of the heat from the gaseous medium prior to passage of the gaseous medium through the heat exchanger, causing water from the heated layer in the storage container to be contacted in the water spray by the medium passing over the heat emitting apparatus when the heat emitting apparatus is not operating to highly heat the medium prior to passage of the medium through the heat exchanger, and continuously passing a second medium through the heat exchanger to recover heat from the gaseous medium.

References Cited in the file of this patent

UNITED STATES PATENTS 568,615    Haubtman  ------------ Sept. 29, 1896

FOREIGN PATENTS 588,062    Great Britain  ---------- May 13, 1947